United States Patent [19]
Armbrust, Jr.

[11] Patent Number: 5,445,808
[45] Date of Patent: Aug. 29, 1995

[54] PROCESS FOR PREPARING ULTRA-WHITE ALUMINA TRIHYDRATE

[75] Inventor: Bernard F. Armbrust, Jr., Benton, Ark.

[73] Assignee: Reynolds Metal Company, Richmond, Va.

[21] Appl. No.: 267,070

[22] Filed: Jun. 27, 1994

Related U.S. Application Data

[62] Division of Ser. No. 926,268, Aug. 5, 1992, Pat. No. 5,342,485.

[51] Int. Cl.$^6$ .............................................. C01F 7/02
[52] U.S. Cl. ................................. 423/629; 423/122; 423/124
[58] Field of Search .................... 423/629, 122, 124

[56] References Cited

U.S. PATENT DOCUMENTS

| | | | |
|---|---|---|---|
| 3,212,911 | 10/1965 | Bernstein et al. | 106/300 |
| 3,268,295 | 8/1966 | Armbrust, Jr. | 23/141 |
| 3,650,793 | 3/1972 | Goodspeed et al. | 106/300 |
| 3,718,494 | 2/1973 | Jacobson | 106/291 |
| 3,832,442 | 8/1974 | Emerson | 423/111 |
| 3,897,261 | 7/1975 | Allen | 106/300 |
| 3,928,057 | 12/1975 | DeColibus | 106/300 |
| 4,075,031 | 2/1978 | Allen | 106/300 |
| 4,125,412 | 11/1978 | West | 106/300 |
| 4,166,100 | 8/1979 | Vorobiev et al. | 423/626 |
| 4,225,639 | 9/1980 | Matyasi et al. | 427/372.2 |
| 4,595,581 | 6/1986 | Misra et al. | 423/625 |
| 4,637,908 | 1/1987 | Weingartner | 264/143 |
| 4,786,482 | 11/1988 | The et al. | 423/629 |
| 4,847,064 | 7/1989 | Pearson | 423/625 |
| 4,915,930 | 4/1990 | Goheen et al. | 423/629 |
| 4,946,666 | 8/1990 | Brown | 423/625 |
| 5,102,426 | 4/1992 | Hiscox et al. | 423/629 |

FOREIGN PATENT DOCUMENTS 203038  10/1983  Germany ............................. 423/629

OTHER PUBLICATIONS

"Measurement and Control of the Optical Properties of Paper," Technidyne Corp., New Albany, Indiana, 1987, no month, by Popson, S. J. et al., pp. 8–9.

*Primary Examiner*—Steven Bos
*Attorney, Agent, or Firm*—Alan M. Biddison

[57] ABSTRACT

A process for preparing an ultra-white alumina trihydrate having a G.E. brightness of at least about 98%. The product is alumina trihydrate that has been rehydrated with coprecipitation, and the crystal phase of the product is primarily gibbsite in thin platelet form having a ratio of thickness to diameter of about 0.2 to about 0.3. The product is prepared by flash activation of a white initial alumina trihydrate, addition of the activated material to a purified sodium aluminate liquor having an alumina to caustic ratio of about 0.5, and rehydrating and precipitating the alumina at ambient temperature under agitation for about 48 hours, followed by washing and drying of the resulting precipitate. The material is especially useful as a filler or coating in papermaking, and it can be substituted for a portion of titanium dioxide pigment in the ratio of 1:1, and can be combined with titanium dioxide as a pigment mixture, either in slurry form or in dry form. The pigment mixture is added to the papermill machine chest to enhance optical properties beyond those achieved by either pigment alone.

9 Claims, 2 Drawing Sheets

PROCESS FOR PREPARING ULTRA-WHITE ALUMINA TRIHYDRATE

This application is a division of Ser. No. 07/926,268 filed Aug. 5, 1992, now U.S. Pat. No. 5,342,485.

BACKGROUND OF THE INVENTION

1. Field of the Invention

The present invention relates to a process for preparing alumina trihydrate having significantly greater whiteness and brightness than commonly available alumina trihydrate. More particularly, the present invention relates to a process for increasing the G. E. brightness and ASTM whiteness level of alumina trihydrate to levels of at least about 98% and 99%, respectively, and with a thin, platelet structure suitable for use as a paper filler or coating material for whitening and brightening purposes in a papermaking process.

2. Description of the Related Art

Methods for producing white alumina trihydrates from sodium aluminate solutions are known, as is the application of the hydrates in papermaking processes, for use in both coatings and fillers to improve whiteness and brightness. For example, in U.S. Pat. No. 3,832,442, which issued on Aug. 27, 1974, to Robert B. Emerson, there is disclosed a process for producing alumina trihydrates of assertedly higher purity and greater whiteness. The disclosed process involves contacting with activated alumina a solution of sodium aluminate in slurry form that can be provided as a by-product of the Bayer process. The solution is sometimes referred to as a "Bayer process liquor," and the alumina serves as a purifying agent to remove impurities from the liquor so that alumina trihydrates that are precipitated from the purified solution have improved whiteness as compared with precipitates from untreated liquor, from carbonaceous filter treated liquor, and from alpha-methyl cellulose treated liquor. However, although the product resulting from the disclosed process had improved whiteness over pre-existing approaches, even higher whiteness levels are desirable.

A patent that discloses a process for preparing an alumina monohydrate for use as a pigment or filler in papermaking processes is U.S. Pat. No. 4,946,666, which issued on Aug. 7, 1990, to Neil Brown. The product of that process is a flat, crystalline boehmite, the crystals having an hexagonal shape and a particle size of between 0.2 and 0.8 microns. The process includes an oxidation step that requires autoclaving of the Bayer liquor under vigorous agitation to induce nucleation of crystalline boehmite upon cooling.

Although the known processes provide alumina having a satisfactory whiteness level, it is an object of the present invention to provide a process for preparing an alumina trihydrate that has even greater brightness and whiteness and that also is suitable for use in papermaking processes as a brightness and whitening agent for providing paper of improved brightness and whiteness.

SUMMARY OF THE INVENTION

Briefly stated, in accordance with one aspect of the present invention, an improved process is provided for significantly increasing the brightness and whiteness of alumina trihydrate. The process includes rapidly flash activating an initial white alumina trihydrate and reducing the particle size of the activated material to less than about 6 μm to provide an activated alumina seed capable of being rehydrated to an alumina trihydrate. The activated alumina seed is rehydrated by admixing with a purified sodium aluminate process liquor having a ratio of aluminum oxide to caustic soda (expressed as equivalent sodium carbonate) of about 0.5 and is agitated for about 48 hours at ambient temperature in a vessel to form a slurry. The solids are subsequently separated from the liquid component of the slurry, and the solids are washed and dried to provide the resulting ultra-white alumina hydrate product having a G.E. brightness value of at least about 98%.

In accordance with another aspect of the present invention an alumina trihydrate product prepared in accordance with the process is provided as an additive for imparting whiteness.

In accordance with still another aspect of the present invention an alumina trihydrate product prepared in accordance with the process is a component of a pigment mixture of titanium dioxide and the alumina trihydrate product.

DESCRIPTION OF THE PREFERRED EMBODIMENTS

The present invention utilizes an initial white alumina trihydrate material as a feed stock to be used in a process from which the ultimate, ultra-white alumina trihydrate product is obtained. Preferably, the starting white trihydrate is a relatively coarse material, with a particle size such that as much as 30%–40% of the material is <325 mesh (44 μm). If the starting alumina trihydrate that is subsequently activated is substantially finer than the particle size specified, having a fineness level of about 9 to 10 μm, for example, it will not result in an activated $Al_2O_3$ product that is capable of being rehydrated to the desirable physical form after flash activation in the manner hereinafter described. In that regard, the desirable form for the final, rehydrated material is very thin platelets, and the crystal phase is preferably gibbsite, or at least predominately gibbsite, along with bayerite or nordstrandite, all of which are the desirable trihydrate form. Instead, the finer particles will result in a rehydrated product of predominately pseudoboehmite, with very little of the desired trihydrate phases present under any rehydration conditions, and with an unacceptably low brightness value of less than about 95%.

In addition to the necessary fineness level of the starting alumina trihydrate, it also must be as white as possible. Preferably, the starting material has a Hunter "b" value of less than 0.3%, an ASTM whiteness index of greater than 97%, an ASTM yellow index of less than 0.15%, and a G.E. brightness of greater than 97.5%.

Figures 1, 2:
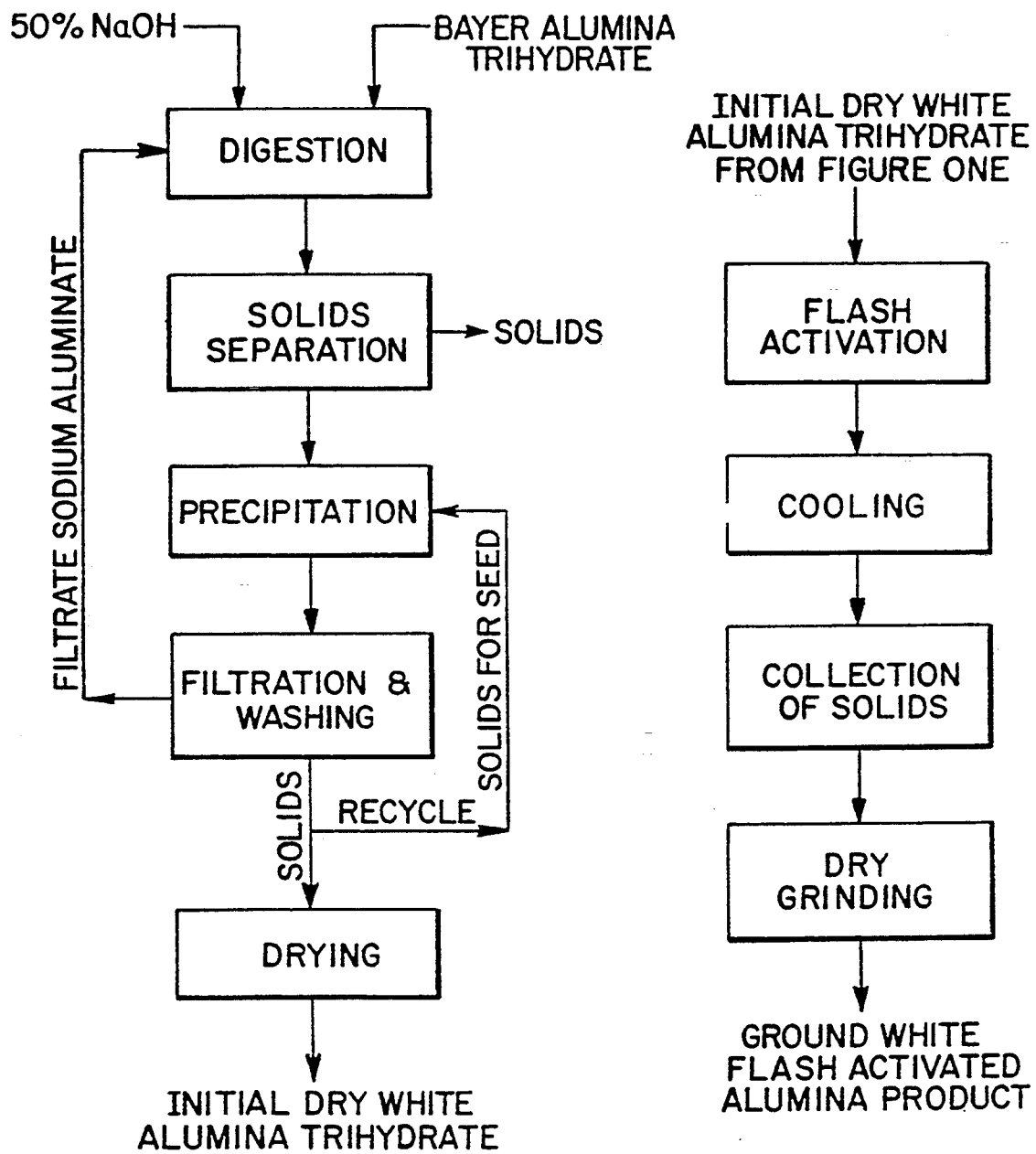
FIG. 1 is a flow chart showing the process steps for one process for the dissolution of alumina trihydrate in caustic to 0.6 A/C, along with subsequent filtration, for making an alumina trihydrate starting material that is suitable for use in the present invention.
FIG. 2 is a flow chart showing the process steps for an alumina hydrate activation process for providing an activated alumina seed material capable of being rehydrated to alumina trihydrate for a subsequent precipitation step in accordance with the present invention.

Although the desired starting alumina trihydrate material can be prepared by a number of different processes, one process that has been found to provide an alumina trihydrate that has the necessary properties for successful use in the process of the present invention is shown in flow chart form in FIG. 1. The process illustrated in FIG. 1 utilizes as one of the starting materials a sodium aluminate liquor having an alumina to caustic soda ratio of about 0.7, based upon the sodium carbonate equivalent of the caustic soda present in solution. An especially preferred solution for use in the process illustrated in FIG. 1 has a caustic content of 168.6 g/kg of solution, expressed as $Na_2CO_3$, a total soda content of 216.8 g/kg, expressed as $Na_2CO_3$, an $Al_2O_3$ content of 117.5 g/kg, and a specific gravity of 1.31. Additional information relating to the preparation of alumina hydrates in general can be found in applicant's earlier patent, U.S. Pat. No. 3,268,295, which issued on Aug. 23, 1966, the disclosure of which is hereby incorporated by reference to the same extent as if fully rewritten herein.

The starting trihydrate produced in accordance with the process illustrated in FIG. 1 is flash activated at a temperature of about 900° F. for about 2 seconds or less in the process shown in FIG. 2. It is essential that a white trihydrate be employed as the feed material for activation, because although normal Bayer trihydrate that is activated and rehydrated in accordance with the method steps disclosed herein will produce the desired thin, flat, platelet structure in the final product, the brightness and whiteness of that final product will not conform with the desired level for a starting alumina hydrate material in accordance with the present invention, and it will, therefore, not be acceptable.

The flash activated material is ground to a particle size of about 4 to 6 $\mu m$. For that purpose, a ceramic lined, fluid energy mill has been found to provide the desired particle size, although an impact mill may also be used. However, unless the exposed metal surfaces are lined with ceramic or with polyurethane to avoid contamination and excessive wear, an impact mill will probably be more costly to operate and will require greater maintenance because of the abrasive qualities of the activated alumina.

The particle size of the activated alumina that is to be rehydrated is important because it influences both the particle size of the final product as well as its morphology. A relatively coarse activated material, 80% of the particles having a particle size greater than 44 $\mu m$, when rehydrated in NaOH will provide a rehydrated product having an LOI of 30% to 31%, which will be predominately gibbsite, will have about a 5 $\mu m$ average particle diameter, and a G.E. brightness of about 98%. However, the morphology of the product will be in the form of long, thin rods having an hexagonal cross section and with an L/D ratio of about 2 to 5. Such a material could be ground to a desired particle size of 1 $\mu m$ in a wet attrition mill, which would enhance the brightness level to between 98.5% to 98.75%, and which would make the product acceptable for use in a paper pigment, but it also would make the product more expensive because of the need for the attrition mill grinding step.

As the particle size of the activated product is reduced to around 6 to 7 $\mu m$, rehydration in NaOH alone has been found to give rise to a blocky, hexagonal morphology, with the final product having a particle size of about 2 to 3 $\mu m$ and a brightness of 98% to 98.3%. That final product would be marginally acceptable without grinding, but, again, additional grinding of the activated material to <3 $\mu m$ involves additional cost, and it does not produce any further size reduction in the particle size of the rehydrated material.

Instead of mechanically grinding the hydrated material to provide the desired small particle size (about 1 $\mu m$), the present invention provides size reduction by chemical means. It was discovered that the particle size of rehydrated activated alumina was significantly less than that of the initial, relatively coarse particle size activated material that was introduced into a caustic solution for rehydration.

Figure 3:
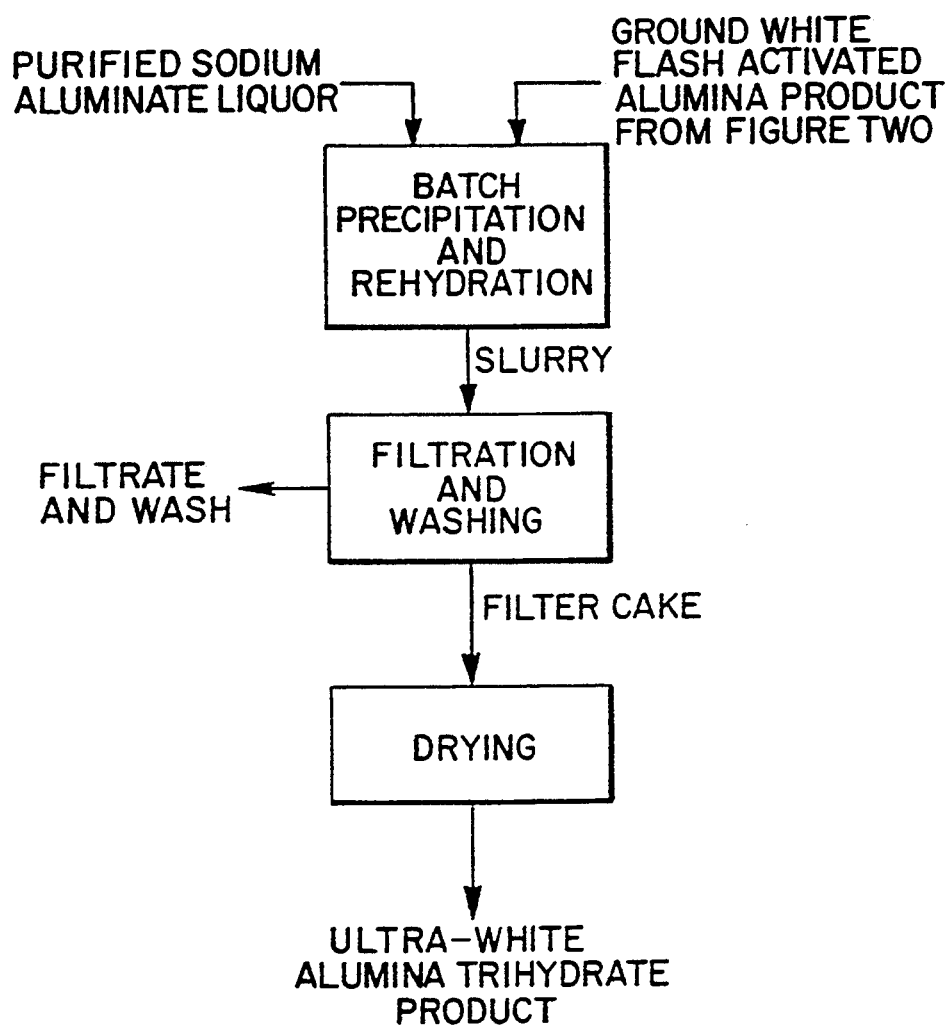
FIG. 3 is a flow chart showing the process steps for an alumina trihydrate precipitation process in accordance with the present invention for obtaining an alumina trihydrate product that has the desired high G.E. brightness and ASTM whiteness properties, as well as the desired particle shape and size distribution.

Referring now to FIG. 3, the ground, activated alumina is added as a seed material to a sodium aluminate solution contained in a vessel. The sodium aluminate solution preferably has an L to P (liquor to precipitation) of 160 g/kg of caustic, 86 g/kg of alumina, and an alumina to caustic ratio of 0.54. Such a solution can be obtained by mixing suitable parts of the green liquor, the recycled spent liquor, and the wash filtrate, to dilute the A/C ratio of the original green liquor. For example, the blend can include the following constituents by weight to provide a final L to P liquor having an A/C ratio of 0.54:

70% of the green liquor of FIG. 1, having 170 g/kg C, 111 g/kg A, an A/C of 0.65, and a specific gravity of 1.285;

24% recycled spent liquor at 0.22 A/C; and

6% wash filtrate at 0.22 A/C.

The final liquor is cooled to a temperature of about 25° C., which is an important criterion for the present invention, in that higher temperatures will result in larger particle sizes for the final product. For example, if seeding occurs with the final liquor at about 50° C., the particle size of the final white product will be about two times larger than when the final liquor is at 25° C. and the brightness of the final product will be reduced by about 0.5 to about 0.6 percentage points.

The solution is maintained at a temperature of about 25° C., and the mixture is subjected to strong agitation for a period of about 48 hours, during which time the activated material is being rehydrated and some $Al_2O_3.3H_2O$ is being precipitated. The resulting slurry has a solids content of about 10% and is filtered, followed by three displacement washes of hot water at a temperature of about 90° C. The resulting filter cake is dried at 105° C. and provides a product having substantially the following properties:

| | |
|---|---|
| LOI | 31% |
| Surface Area | 66 $m^2/g$ |
| Absolute density | 2.47 $g/cm^3$ |
| Avg. Particle Dia. | 0.77 $\mu m$ |
| G.E. Brightness | 99.2% |
| DWL | 470 nm |
| ASTM Whiteness | 100.6% |
| ASTM Yellow | −0.67% |
| Hunter L | 99% |
| Hunter a | 0.16% |
| Hunter b | −0.56% | wherein LOI represents the loss on ignition for 1 hour at 1000° C., and particle size is determined using a Sedigraph Model 5000 particle size analyzer, available from Micrometrics Instrument Corp., Norcross, Ga.

The final rehydrated alumina in the form of alumina trihydrate should be approximately equal in amount to the amount precipitated from the liquor as gibbsite. In that regard, it is important to note that the final product is not merely a rehydrated alumina, it is both rehydrated and precipitated. Further, it appears that a ratio in the final product of rehydrated alumina trihydrate to precipitated alumina trihydrate of from about 0.8 to about 1.2, preferably from about 0.95 to about 1.05, is necessary to result in a final product having good brightness and good platelet formation. That ratio is a calculated value based upon the LOI of the final product, $Al_2O_3$ from activated material, $Al_2O_3$ from precipitated material, and the theoretical LOI of precipitated gibbsite. If the material is outside the range of the ratios given above, the brightness and other optical properties of the final product are diminished, and it is believed that the morpholgy of the final product would be different from the platelet form shown and described herein.

The mechanism of formation of the platelets in the final product is theorized to be that the platelets grow out of an activated particle as the latter rehydrates, and that the rehydrated particle acts as a seed to permit the platelet growth. The platelets are thought to grow to a certain size and then break off the rehydrated particle, and that other platelets then grow from the resulting smaller seed particle as the rehydration process continues. Neither precipitation alone nor rehydration alone will produce the desired final product morphology. Additionally, maintenance of the temperature of the materials undergoing rehydration and precipitation is very important to produce a final product having the desired particle size of less than 1.0 $\mu$m.

It is also important that the LOI of the rehydrated phase be at least 30%, for product having an LOI of 27% or less will not provide the desired brightness levels. Additionally, flash activated materials rehydrated in NaOH alone have also shown that at least 30% LOI is necessary for best brightness.

Without coprecipitation, if the activated material is coarse the resulting product will be in the form of rods, instead of the desired platelets. In that regard, the preferred platelet structure is in the form of thin, flat, generally hexagonal platelets having a ratio of thickness to diameter (L/D) of substantially less than 1, preferably about 0.2.

Ultra-white alumina trihydrate in accordance with the present invention can be obtained by carrying out the process described in the following example:

EXAMPLE

The starting material for the process for preparing the desired fine, ultra-white alumina trihydrate is a dry, white, alumina trihydrate, having a G.E. brightness of about 97%. The starting material can be prepared by dissolving a conventional beige colored, Bayer process alumina trihydrate in caustic to an A/C of about 0.6 in any convenient digestion apparatus. The digestion liquor is filtered and is subjected to conventional Bayer precipitation techniques by using previously-prepared white alumina trihydrate as a seed material. The precipitated alumina trihydrate and Bayer-type spent liquor are filtered to provide a filter cake containing about 80% solids, which is then washed in two displacement washes and dried to provide a dry, white, alumina trihydrate initial material having a G.E. brightness of about 97%.

The dry, white alumina trihydrate initial material can be flash activated at 900° F. for 2 seconds and the activated product can be dry ground to a particle size of 5 $\mu$m in a fluid energy mill to provide a ground, white, flash activated product to serve as a seed in a subsequent precipitation step. The activated product can have an LOI of 6%.

An L to P liquor can be provided having the following analysis:

| | |
|---|---|
| Caustic soda (C) | 142.68 g/kg |
| Total Soda (S) | 185.13 g/kg |
| Alumina (A) | 76.80 g/kg |
| Specific Gravity | 1.241 |
| A/C ratio | 0.538 |

The liquor can be cooled to 25° C. and can be deposited in a vessel along with the ground, white, flash activated alumina in the ratio of 1000 kg of liquor to 52 kg of activated alumina.

The rehydration/precipitation can be carried out at 25° C. for 48 hours under strong agitation of the liquor-alumina mixture, during which time the activated alumina is being rehydrated and some $Al_2O_3.3H_2O$ is being precipitated. The resulting slurry can have a solids content of 13.24% by weight, and can be filtered and washed with three displacement washes of distilled water at 90° C. The separated, spent sodium aluminate liquor can be at an A/C of 0.222. After washing, the filter cake can be dried at 105° C. to provide an ultra-white alumina product composed of 50% rehydrated alumina and 50% precipitated alumina, the product having the following analysis:

| | |
|---|---|
| LOI | 31.54 |
| Surface Area | 69 m$^2$/g |
| Absolute density | 2.55 g/cm$^3$ |
| Avg. Particle Dia. | 0.61 $\mu$m |
| G.E. Brightness | 99.2% |
| DWL | 470 nm |
| ASTM Whiteness | 100.6% |
| ASTM Yellow | −0.6% |
| Hunter L | 99% |
| Hunter a | 0.16% |
| Hunter b | −0.56% |

The product that results from the process described above can advantageously be employed in papermaking to improve the brightness and whiteness of the resulting paper product, and at a lower cost than would result from using solely $TiO_2$ as the pigment material, which is generally considered to be the most effective additive for that purpose. In that regard, commercially available alumina trihydrates have been used in the past as additives for fillers and coatings for paper. Further, it is known in the papermaking art that ultrafine, white alumina trihydrates could be substituted for up to about 15% to 20% of the $TiO_2$ pigment normally used in paper filling applications, to thereby serve as a pigment extender.

For example, such a filler content of the paper can be prepared by adding the $TiO_2$ and commercially available alumina trihydrate not having the properties of the product of this invention separately to the thick stock mix tank before the stock enters the suction side of the paper machine's fan pump. The final pigment content of the filled paper would have no more than 20% of the $TiO_2$ replaced on a two part alumina trihydrate for one part TiO$_2$ removed basis, without loss of G.E. brightness and opacity. Therefore, in a paper normally containing 10% by weight TiO$_2$ pigment for G.E. brightness and opacity control, up to 2% by weight TiO$_2$ could be replaced with 4% by weight of such a white alumina trihydrate to give a total pigment content of 12% by weight of the paper sheet without loss of optical properties.

In order to maintain a given paper basis weight (lbs/3000 ft.$^2$), the weight of the cellulose content of the paper could be reduced, but a reduction in cellulose content would result in an undesirable reduction in the physical properties of the paper, such as tensile strength, tear resistance, and burst strength. Even allowing the basis weight to rise by 2 lbs/3000 ft.$^2$ would still result in some loss in physical properties.

Surprisingly, the product of the present invention has been found to be a better, more effective extender for TiO$_2$ pigment, when considered relative to the optical properties of the resulting paper product, than are conventional, so-called "white trihydrates" that are commercially available. For example, in tests conducted on a pilot plant papermaking machine, when using pure compounds, it was found that only 11 lbs. of the product of the present invention per 100 lbs. of paper would produce a G. E. brightness (TAPPI method) of 88%. When the best commercially available white trihydrate was used, it was found that 11.6 lbs. of conventional white trihydrate per 100 lbs. paper, over 5% more, were required to provide the same brightness value.

The difference was even more dramatic when a G. E. brightness of 92% was required. In that instance 18 lbs. of the product of the present invention per 100 lbs. paper provided the desired result, whereas 19.1 lbs., over 6% more, of the leading commercially available trihydrate were required to provide the same brightness value. The amounts of TiO$_2$ pigment required to achieve these G. E. brightness levels of 88% and 92% were only marginally less than the product of this invention, i.e., 10.5 lbs. per 100 lbs. paper at 88% brightness and 17.7 lbs. per 100 lbs. paper at 92% brightness, but significantly less than the leading commercially available alumina trihydrate.

Because of the relatively low refractive index of alumina trihydrate, neither the commercially available alumina trihydrate nor the aluminum trihydrate made in accordance with the present invention performed as well as TiO$_2$ in imparting opacity to paper. When only TiO$_2$ was used, 5.2 lbs. TiO$_2$ per 100 lbs. of paper were required to achieve 90% opacity, and 10.5 lbs. TiO$_2$ per 100 lbs. of paper were required to achieve 94% opacity. By contrast, about 9 lbs. of each of the alumina trihydrates were required to achieve 90% opacity. However, only 17.4 lbs. of the product made in accordance with the present invention were required for 94% opacity, whereas 23.8 lbs. of the leading commercially available alumina trihydrate were required.

Other optical properties of the paper, such as Hunter "b" (a measure of yellowness) and ASTM whiteness, showed improvements similar to the G. E. brightness results when the two types of trihydrates were separately combined with TiO$_2$. The papers for the above-described tests were produced based upon the following:

| furnish | 50/50 Dryden DCX softwood/James River dry lap pulp and Burgess Hardwood - bleached Kraft dry lap pulp; |
|---|---|
| freeness | 350 mls Canadian standard freeness; |
| basis weight | 55 lbs/3000 ft.$^2$; |
| Ph | 7.9–8.1; |
| TiO$_2$ | TI-PURE (E. I. DuPont de Nemours, Wilmington, Delaware) |
| internal size | Hercon 76 (Hercules, Inc., Wilmington, Delaware), 3 lbs/ton; and |
| machine speed | 75 ft/min. |

The fillers were initially slurried individually to provide separate slurries each containing 15% solids, and they were thereafter added to the first thick stock mix tank before the stock entered the suction side of the papermaking machine's fan pump. Paper coming off the fourdrinier wire was trimmed to about 20 inches.

When TiO$_2$ was slurried alone at 30% solids and added as a base load to the thick stock in the machine chest at a level to give a total pigment weight of 4.44 lbs. per 100 lbs. of paper, unexpected improvements in optical properties were observed with the addition to the slurry of the product made in accordance with the present invention. The slurry was added to the thick stock mix tank, to the TiO$_2$ base loaded stock, and was made into paper under the same conditions as above. For example, a G. E. brightness of 89% was achieved in the base stock loaded stock with 4.4 lbs. TiO$_2$ per 100 lbs. paper originally present from the machine chest. When 3 lbs. of the product made in accordance with the present invention were added to the TiO$_2$ base loaded stock per 100 lbs. paper, the G. E. brightness level rose to 90%.

In comparison, the addition to the base loaded stock of 5 lbs. of the leading commercially available trihydrate per 100 lbs. of paper only resulted in a G. E. brightness of 89%. Adding an additional 3.6 lbs. TiO$_2$ per 100 lbs. paper to the base loaded stock only produced a G. E. brightness of 89.7%.

Even more striking differences were observed when a G. E. brightness of 91% was required from the base loaded stock. Only 9.2 lbs. per 100 lbs. paper of the product made in accordance with the present invention were required, whereas more than 14 lbs. of the leading commercially available trihydrate were required, and even 11 lbs. of TiO$_2$ was necessary to achieve that brightness value when TiO$_2$ alone was added to the base loaded stock. Clearly, the product made in accordance with the present invention operated to extend the TiO$_2$ in the base loaded stock to make it more efficient. Neither the leading commercially available alumina trihydrate nor TiO$_2$ by itself provided such a result.

The best criterion for measuring the beneficial TiO$_2$ extension characteristics of the product made in accordance with the present invention is opacity. For example, the base loaded stock had an opacity of 91% and it would take 2.1 lbs. more TiO$_2$ above the base loaded stock to achieve a 92% opacity. It required 3.5 lbs. of the product of this invention and 4.0 lbs. of the leading commercially available alumina trihydrate to achieve the same 92% opacity in the base loaded stock. Similarly, for a 93% opacity value, 4.2 lbs. more TiO$_2$ would be required, and only 7 lbs. of the product of this invention would be necessary. By comparison, 10.2 lbs. of the leading commercially available alumina trihydrate would be required to obtain the same result, thereby showing the improved TiO$_2$ extension obtained when using the product of the present invention as opposed to the leading commercially available alumina trihydrate.

The importance of the differences in extension of the highly expensive TiO$_2$ derives from the relative costs of the materials. Both the alumina trihydrate materials (the product of this invention and the leading commercially available alumina trihydrate) normally are less than about one-half the cost of TiO$_2$. Thus, if 4.2 lbs. of TiO$_2$ are required to achieve a 93% opacity, or an improvement of two percentage points above the base loaded stock having a 91% opacity, greater cost savings would accrue by using 7 lbs. of the product of this invention, rather than 10.2 lbs. of the leading commercially available alumina trihydrate, in place of 4.2 lbs. TiO$_2$ to provide the same results.

Although the improved alumina hydrate product in accordance with this invention has been shown to be a better extender for TiO$_2$ than commercially available alumina trihydrates when the materials are added at the conventional point in the process (to the thick stock mix tank), even more significant unexpected results were observed when the product of this invention and TiO$_2$ were premixed prior to addition to either the thick stock mix tank or the machine chest upstream of the thick stock mix tank. In that regard, the papermaking machine operating parameters remained as they were for the tests described above, except that 5 lbs. per ton alum were added to the internal size (Hercon 76) to help "set" the size in the paper. As a result, the pH varied between 6.9 and 8.9, instead of between 7.9 and 8.1. The TiO$_2$ and the alumina hydrate product of the present invention were slurried together at the desired ratios before addition to the thick stock mix tank, rather than being slurried separately and then simultaneously added independently to the thick stock mix tank, as was done in the previously-described tests. The preblending was performed to provide both 15% total solids and 30% total solids (TiO$_2$+alumina trihydrate) in varying ratios of TiO$_2$:Al$_2$O$_3$.3H$_2$O. Individual, pre-slurried blends were then added to the paper stock, either at the conventional point in the papermaking process (to the first thick stock mix tank ahead of the suction to the fan pump), or directly to the beater thick stock in the machine chest, which is before the first thick stock mix tank. No additional pigment slurries were added to the first thick stock mix tank.

In all the tests that were run, the optical properties of the paper were improved over those that were found when TiO$_2$ was used by itself and without any alumina hydrate. Instead of the previously-taught substitution of 2 parts alumina trihydrate for 1 part TiO$_2$, the technique of preblending TiO$_2$ and the product of the present invention permitted substitution on a 1:1 basis. The following test results were obtained from the pilot plant papermaking machine:

| (a) | pure TiO$_2$ only: | |
|---|---|---|
| | at 2% total pigment | |
| | G.E. brightness | 87% |
| | opacity | 85% |
| | ASTM whiteness | 72% |
| | at 5% total pigment | |
| | G. E. brightness | 88% |
| | opacity | 89% |
| | ASTM whiteness | 74% |
| | at 10% total pigment | |
| | G. E. brightness | 90% |

-continued

| | | |
|---|---|---|
| | opacity | 95% |
| | ASTM whiteness | 78%. |
| (b) | a preblended pigment based upon 70% TiO$_2$ and 30% of the product of the present invention, by weight, | |
| | at 2% total pigment | |
| | G. E. brightness | 87% |
| | opacity | 85% |
| | ASTM whiteness | 72% |
| | at 5% total pigment | |
| | G.E. brightness | 89% |
| | opacity | 89% |
| | ASTM whiteness | 75% |
| | at 10% total pigment | |
| | G. E. brightness | 92% |
| | opacity | 96% |
| | ASTM whiteness | 81% |
| (c) | a preblended pigment including 30% TiO$_2$ and 70% by weight of the product of the present invention | |
| | at 2% total pigment | |
| | G. E. brightness | 87% |
| | opacity | 84% |
| | ASTM whiteness | 72% |
| | at 5% total pigment | |
| | G. E. brightness | 89% |
| | opacity | 89% |
| | ASTM whiteness | 77% |
| | at 10% total pigment | |
| | G. E. brightness | 93% |
| | opacity | 96% |
| | ASTM whiteness | 84% |

The above data clearly show that the product of the present invention preblended with TiO$_2$ provided significantly improved optical properties at very low pigment levels corresponding with amounts of TiO$_2$ of about 3%, by weight, without resulting in any change the paper basis weights, as resulted from the prior art technique based upon commercially available, ultrafine, white alumina trihydrate. The results given above show a clear synergistic effect between the TiO$_2$ and the product of the present invention, with optical properties of the combined materials far exceeding the weighted averages of the expected optical properties for the two materials. For example, for the 30% TiO$_2$, 70% alumina trihydrate, the weighted average for opacity at a 10% total pigment loading would be only 86%, as compared with the 96% that actually resulted from the combination of the materials.

Although the optical properties of papers containing the preblended pigments were independent of whether the pigment was added to the thick stock mix tank or to the machine chest, unexpectedly, physical properties were affected. Pure TiO$_2$ or pure alumina trihydrate showed no effect on physical properties due to addition point. However, the preblended products were significantly influenced by addition point. For example, adding a preblended 30% TiO$_2$, 70% alumina trihydrate at the 6% total pigment weight level to the thick stock mix tank resulted in a paper having a burst index of only 1.7 KPa.M$^2$/g, whereas, that same preblended pigment added to the machine chest at the 6% total pigment weight level resulted in a paper having a burst index of 2.1 KPa.M$^2$/g. Similar results were noted for tensile strength and tear resistance in that the addition of preblended pigment to the machine chest resulted in a smaller effect on these properties when added at that point in the papermaking process than when they were added to the first thick stock mix tank. Normally, any diluent, such as a pigment, when added to paper, plastics, rubber, and the like, will result in a reduction of physical property values to a value less than that for pure cellulose, plastic, etc., unless it happened to be a reinforcing pigment such as carbon in rubber wherein some physical or chemical bonding occurs. Therefore, it is totally unexpected to discover that the preblended combination of $TiO_2$ and the product of this invention exhibits less of a diluent effect.

Another variant of the process is to preblend the alumina trihydrate and $TiO_2$ pigments at the point of manufacture to provide a single dry pigment to the user. Several different blends could be provided in this manner to suit the user's need. The user would need only to slurry a single blended pigment at 30% solids and add to the machine chest as described above.

Although particular embodiments of the present invention have been illustrated and described, it will be apparent to those skilled in the art that various changes and modifications can be made without departing from the spirit of the present invention. It is, therefore, intended to encompass within the appended claims all such changes and modifications that fall within the scope of the present invention.

What is claimed is:

1. A process for preparing a powdered alumina trihydrate having improved whiteness, said process comprising the steps of:
   (a) providing a dry, white, initial alumina trihydrate;
   (b) flash activating the initial alumina trihydrate to provide activated alumina capable of being rehydrated to an alumina trihydrate;
   (c) reducing the particle size of the activated alumina to provide an activated alumina seed;
   (d) rehydrating the activated alumina seed by admixing with a purified sodium aluminate liquor while simultaneously precipitating alumina trihydrate to provide an alumina slurry containing rehydrated and precipitated alumina trihydrate solids;
   (e) agitating the alumina slurry;
   (f) separating the rehydrated and precipitated alumina trihydrate solids from the slurry, washing the solids; and
   (g) drying the separated solids from step (f) to a moisture level of about 1%.

2. A process in accordance with claim 1 wherein the initial alumina trihydrate has a G.E. brightness value greater than about 97%.

3. A process in accordance with claim 1 wherein the flash activation step is performed at a temperature of about 900° F.

4. A process in accordance with claim 3 wherein the flash activation step is performed for a time less than about 2 seconds.

5. A process in accordance with claim 1 wherein the particle size of the activated alumina is reduced to less than about 6 μm in the particle size reduction step.

6. A process in accordance with claim 1 wherein the purified sodium aluminate liquor has an aluminum oxide to caustic soda ratio of about 0.5.

7. A process in accordance with claim 1 wherein the agitation step is carried out for a time period of about 48 hours.

8. A process in accordance with claim 7 wherein the agitation step is carried out at ambient temperature.

9. A process for preparing a powdered alumina trihydrate having improved G.E. brightness and ASTM whiteness, said process comprising the steps of:
   (a) providing a dry, white, initial alumina trihydrate having a G.E. brightness greater than about 97%;
   (b) flash activating the initial alumina trihydrate at a temperature of about 900° F. for a time less than about 2 seconds to provide activated alumina capable of being rehydrated to an alumina trihydrate;
   (c) reducing the particle size of the activated alumina to less than about 6 μm to provide an activated alumina seed;
   (d) rehydrating the activated alumina seed by admixing with a purified sodium aluminate liquor having an aluminum oxide to caustic soda ratio of about 0.5 while simultaneously precipitating alumina trihydrate to provide an alumina slurry containing rehydrated and precipitated alumina trihydrate solids;
   (e) agitating the slurry for about 48 hours at ambient temperature;
   (f) separating the rehydrated alumina and precipitated alumina trihydrate solids from the slurry, washing the solids; and
   (g) drying the separated solids from step (f) to a moisture level of about 1%.

* * * * *